United States Patent
Oroskar

(10) Patent No.: US 8,908,598 B1
(45) Date of Patent: Dec. 9, 2014

(54) SWITCH-LEVEL PAGE SETTINGS BASED ON A COMBINATION OF DEVICE PERFORMANCE AND COVERAGE AREA PERFORMANCE

(75) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 316 days.

(21) Appl. No.: 13/211,849

(22) Filed: Aug. 17, 2011

(51) Int. Cl.
*H04W 68/08* (2009.01)

(52) U.S. Cl.
USPC ............ 370/328; 370/329; 370/331; 370/332

(58) Field of Classification Search
USPC .......................................................... 370/328
See application file for complete search history.

(56) References Cited

U.S. PATENT DOCUMENTS

| | | | |
|---|---|---|---|
| 5,369,681 A | 11/1994 | Boudreau et al. | |
| 5,995,830 A * | 11/1999 | Amin et al. | 455/423 |
| 6,181,945 B1 | 1/2001 | Lee | |
| 6,223,042 B1 | 4/2001 | Raffel | |
| 6,374,114 B1 * | 4/2002 | Kolev | 455/458 |
| 6,542,752 B1 * | 4/2003 | Illidge | 455/458 |
| 6,643,520 B1 | 11/2003 | Kim et al. | |
| 6,745,039 B1 * | 6/2004 | Di Lalla | 455/458 |
| 6,922,561 B2 * | 7/2005 | Chen et al. | 455/435.1 |
| 6,963,750 B1 * | 11/2005 | Cheng et al. | 455/458 |
| 7,047,005 B2 * | 5/2006 | Kinnavy | 455/434 |
| 7,149,535 B1 * | 12/2006 | Chaturvedi et al. | 455/458 |
| 7,366,526 B2 | 4/2008 | Zhang et al. | |
| 7,460,858 B2 * | 12/2008 | Boland et al. | 455/412.2 |
| 7,499,418 B2 * | 3/2009 | Oprescu-Surcobe et al. | 370/311 |
| 7,620,400 B2 * | 11/2009 | Jacobson et al. | 455/438 |
| 7,953,036 B2 * | 5/2011 | Wu et al. | 370/328 |
| 8,155,674 B2 * | 4/2012 | Willey | 455/458 |
| 8,180,365 B2 * | 5/2012 | Toone | 455/456.1 |
| 8,180,375 B2 * | 5/2012 | Awad | 455/456.3 |
| 8,180,381 B1 * | 5/2012 | Shetty et al. | 455/458 |
| 8,204,517 B1 * | 6/2012 | Rai et al. | 455/458 |
| 8,271,000 B1 * | 9/2012 | Khanka et al. | 455/458 |
| 2004/0235482 A1 * | 11/2004 | Sylvain | 455/445 |
| 2007/0105535 A1 | 5/2007 | Jacobson et al. | |
| 2008/0032713 A1 * | 2/2008 | Yang | 455/458 |
| 2008/0051116 A1 * | 2/2008 | Willey | 455/458 |

(Continued)

OTHER PUBLICATIONS

U.S. Appl. No. 12/853,730, filed Aug. 10, 2010 entitled "Reducing the Usage of Non-Preferred Wireless Coverage Areas", Unpublished.

(Continued)

*Primary Examiner* — Ian N Moore
*Assistant Examiner* — Lakeram Jangbahadur

(57) ABSTRACT

Exemplary methods and systems may help to adjust switch-level page settings based on both the performance of the wireless communication device (WCD) that is being paged, and the sector in which the WCD is likely to be located. An exemplary method involves a switch determining that a WCD should be paged and responsive to determining that the WCD should be paged: (a) determining a coverage-area performance indicator for a last-known coverage area of the WCD; (b) determining a WCD performance indicator for the WCD; (c) using both (i) the WCD performance indicator and (ii) the coverage-area performance indicator as a basis for adjusting at least one paging-scheme setting affecting attempts to page the WCD; and (d) paging the WCD according to the at least one adjusted paging-scheme setting.

17 Claims, 6 Drawing Sheets

(56) References Cited

U.S. PATENT DOCUMENTS

| | | | |
|---|---|---|---|
| 2008/0076412 A1* | 3/2008 | Khetawat et al. | 455/432.1 |
| 2008/0096520 A1* | 4/2008 | Benco et al. | 455/404.2 |
| 2008/0293437 A1* | 11/2008 | Ranganathan et al. | 455/458 |
| 2009/0061854 A1 | 3/2009 | Gillot et al. | |
| 2009/0227265 A1* | 9/2009 | Kang et al. | 455/456.1 |
| 2009/0247137 A1 | 10/2009 | Awad | |
| 2010/0317374 A1* | 12/2010 | Alpert et al. | 455/458 |
| 2011/0158202 A1* | 6/2011 | Ozukturk et al. | 370/335 |

OTHER PUBLICATIONS

U.S. Appl. No. 12/690,629, filed Jan. 20, 2010 entitled "Dynamic Paging Concatenation", Unpublished.

U.S. Appl. No. 12/558,359, filed Sep. 11, 2009 entitled "Dynamic Paging Concatenation", Unpublished.

U.S. Appl. No. 12/553,661, filed Sep. 3, 2009 entitled "Method and System for Paging a Mobile Station", Unpublished.

U.S. Appl. No. 12/572,829, filed Oct. 2, 2009 entitled "Overflow Pages in Heavily Loaded Slots", Unpublished.

U.S. Appl. No. 12/776,287, filed May 7, 2010 entitled "Dynamic Paging for Hybrid Mobile Stations", Unpublished.

U.S. Appl. No. 12/786,174, filed May 24, 2010 entitled "Dynamic Paging Concatenation Based on Page-Type", Unpublished.

U.S. Appl. No. 12/756,027, filed Apr. 7, 2010 entitled "Paging Power Control Based on Page Concatenation", Unpublished.

U.S. Appl. No. 12/786,184, filed May 24, 2010 entitled "Dynamic Adjustment of Paging Power Based on Page-Type", Unpublished.

U.S. Appl. No. 12/854,114, filed Aug. 10, 2010 entitled "Dynamic Paging Concatenation Based on the Likelihood of Roaming", Unpublished.

U.S. Appl. No. 12/261,229, filed Oct. 30, 2008 entitled "Method and System of Roaming", Unpublished.

Cai et al., "Mitigating DoS Attacks on the Paging Channel by Efficient Encoding in Page Messages," Computer Science Department, University of California, Davis, Sprint Advanced Technology Labs.

* cited by examiner

SWITCH-LEVEL PAGE SETTINGS BASED ON A COMBINATION OF DEVICE PERFORMANCE AND COVERAGE AREA PERFORMANCE

BACKGROUND

To provide cellular wireless communication service, a wireless service provider or "wireless carrier" typically operates a radio access network (RAN) that defines one or more coverage areas in which wireless communication devices (WCDs) can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which WCDs can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other wireless communication device (WCD) that is positioned within coverage of the RAN can then communicate with a BTS and in turn, via the BTS, with other served devices or with other entities on the transport network.

Wireless communications between a WCD and a serving BTS in a given coverage area will typically be carried out in accordance with one or more agreed air interface protocols that define a mechanism for wireless exchange of information between the WCD and BTS. Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1xEV-DO", or "EVDO")), iDEN, WiMAX (e.g., IEEE 802.16), LTE, TDMA, AMPS, GSM, GPRS, UMTS, or EDGE, and others now known or later developed.

The air interface protocol will generally define a "forward link" encompassing communications from the BTS to WCDs and a "reverse link" encompassing communications from WCDs to the BTS. Further, each of these links may be structured to define particular channels, through use of time division multiplexing, code division multiplexing (e.g., spread-spectrum modulation), frequency division multiplexing, and/or some other mechanism.

The forward link, for example, may define (i) a pilot channel on which the RAN may broadcast a pilot signal to allow WCDs to detect wireless coverage, (ii) system parameter channels (e.g., a sync channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs. And the reverse link, for example, may define (i) access channels on which WCDs may transmit "access probes" such as registration messages and call origination requests, and (ii) traffic channels on which WCDs may transmit bearer traffic for receipt by the RAN.

In a conventional CDMA wireless network compliant with the well-known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code.

When a RAN receives an incoming communication for a WCD, the RAN typically pages the WCD via a paging channel in at least the coverage area in which the WCD last registered. When a cellular wireless communication system seeks to page a WCD (e.g., for an incoming call or for some other reason), a switch in the network may send the page message to numerous base stations in the switch's coverage area, with the hope that when the base stations broadcast the page message, the WCD will receive the page message in one of the associated sectors, and will respond. Further, a switch may be configured to re-send a page in the event that a given attempt to page a WCD fails.

OVERVIEW

Exemplary methods may help a switch to more effectively and/or efficiently page the wireless communication devices (WCDs) that it serves. In particular, when a switch needs to page a given WCD, the switch may determine a performance indicator for the WCD, such as the WCD's dropped-call rate. The switch may also determine a corresponding performance indicator for the WCD's last-known coverage area (where it is likely that the WCD is still located). For example, the switch may determine the dropped-call rate for all WCDs that have engaged in calls in the last-known coverage area. Then, based on the WCD's performance indicator and the last-known coverage area's performance indicator, the switch may determine an overall performance indicator that is applicable to the current paging process for the WCD. As such, the switch may adjust settings for the paging process. For example, if the overall performance indicator is below a certain threshold, then the switch may adjust one or more settings in an effort to increase the probability that a page successfully reaches the WCD. Other examples are also possible.

In one aspect, an exemplary method involves a switch in a radio access network determining that a WCD should be paged and responsive to determining that the WCD should be paged: (a) determining a coverage-area performance indicator for a last-known coverage area of the WCD; (b) determining a WCD performance indicator for the WCD; (c) using both (i) the WCD performance indicator and (ii) the coverage-area performance indicator as a basis for adjusting at least one paging-scheme setting affecting attempts to page the WCD; and (d) paging the WCD according to the at least one adjusted paging-scheme setting.

In a further aspect, another exemplary method involves a switch in a radio access network: (a) determining that a WCD should be paged; (b) determining a WCD performance indicator for the WCD; (c) determining a coverage-area performance indicator for a last-known coverage area of the WCD; (d) using both (i) the WCD performance indicator and (ii) the coverage-area performance indicator as a basis for adjusting at least one paging-scheme setting affecting attempts to page the WCD; and (e) paging the WCD according to the at least one adjusted paging-scheme setting.

In yet a further aspect, an exemplary system may include a non-transitory computer readable medium and program instructions stored on the non-transitory computer readable medium and executable by at least one processor to: (a) determine that a wireless communication device (WCD) should be paged; (b) determine a WCD performance indicator for the WCD; (c) determine a coverage-area performance indicator for a last-known coverage area of the WCD; (d) use both (i) the WCD performance indicator and (ii) the coverage-area performance indicator as a basis to adjust at least one paging-scheme setting affecting attempts to page the WCD; and (e) page the WCD according to the at least one adjusted paging-scheme setting.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

I. Exemplary Network Architecture

Figure 1:
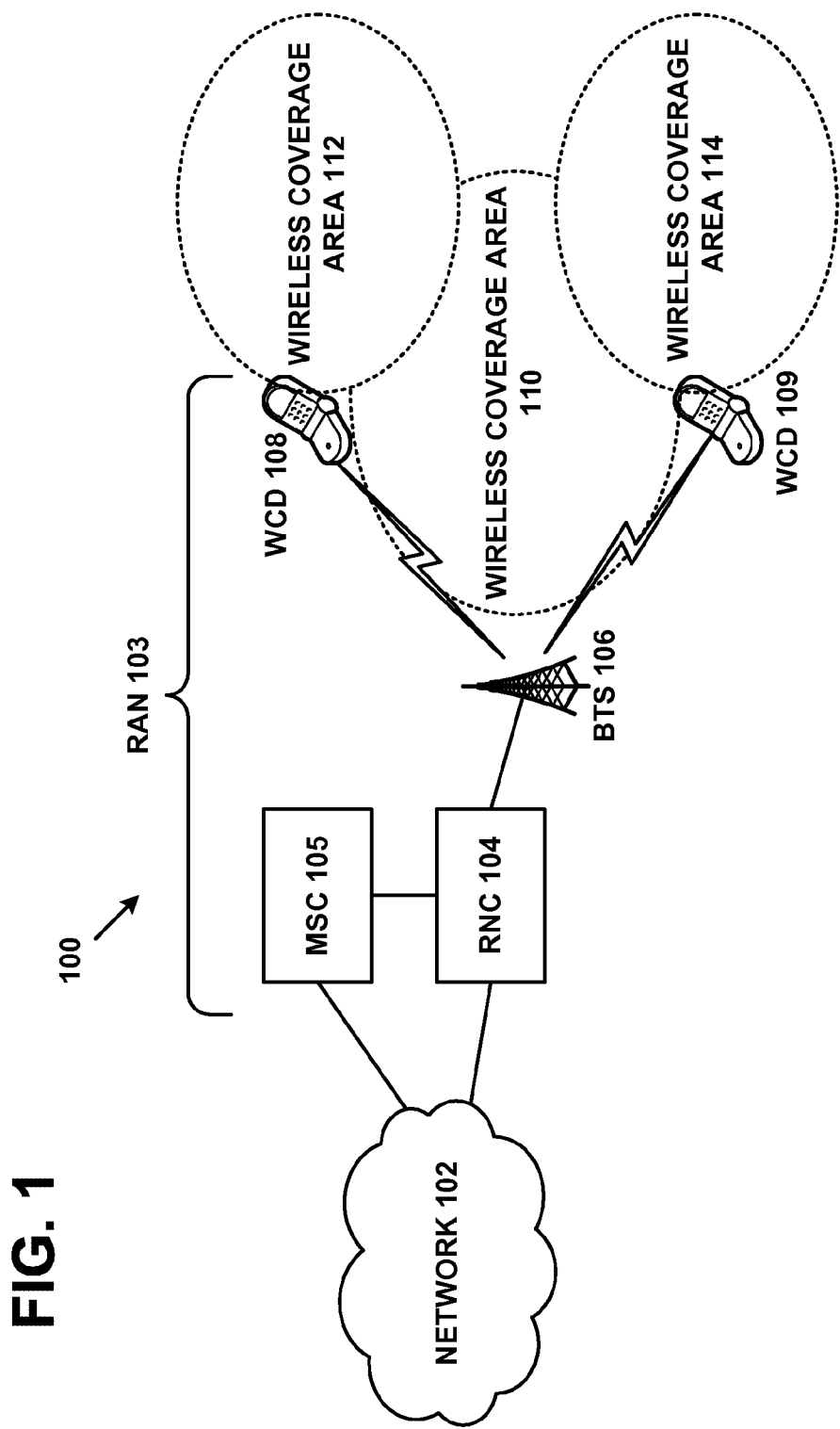
FIG. 1 depicts an exemplary communication system in which exemplary embodiments may be carried out or deployed.

FIG. 1 depicts an exemplary communication system 100 in which the embodiments herein can be carried out or deployed. At a high level, communication system 100 comprises a network 102, a RAN 103, and wireless coverage areas 110, 112, and 114. Any of the wireless coverage areas may provide wireless communication services to WCD 108 and/or WCD 109.

Network 102 is preferably a packet-switched and/or circuit-switched communication network that links RAN 103 to other networks, devices, applications, and/or services. Network 102 may be, for instance, the Internet, a private IP network, the public-switched telephone network (PSTN) or a private circuit-switched network. Network 102 may comprise one or more switches, gateways, routers, signaling nodes, application servers, and/or other types of devices, systems and networks. In one possible embodiment, network 102 includes both packet-switching and circuit-switching capabilities.

RAN 103 may include a base station controller (BSC) 104, a mobile switching center (MSC) 105, a base transceiver station (BTS) 106, and other RAN components. However, for sake of simplicity, FIG. 1 excludes some of these components, such as softswitches, media gateways, media gateway controllers, signaling nodes, authentication servers, registration servers, and so on. Furthermore, throughout this description, the term "RAN component" may be used to refer to a BTS, a BSC, a combination of one or more BTSs and a BSC, or any other type of component used for RAN functionality.

BTS 106 may radiate on one or more frequencies to define wireless coverage area 110. Wireless coverage area 110, may, in turn, serve WCD 108 and/or WCD 109. To supply wireless service to these WCDs, as well as other WCDs, wireless coverage area 110 may include an air interface that comprises one or more forward link and/or reverse link channels. Through the forward and reverse link channels, BTS 106 and WCD 108 and/or WCD 109 may exchange signaling and bearer traffic.

In one possible embodiment, these channels may be formed via a set of orthogonal Code Division Multiple Access (CDMA) codes, each of which may be used to modulate the data transmitted on a particular channel. However, other embodiments using different technologies are also possible. These other technologies include, but are not limited to, Worldwide Interoperability for Microwave Access (WIMAX®), Universal Mobile Telecommunications System (UMTS®), Long Term Evolution (LTE®), IDEN®, or 802.11 (Wifi). Thus, RAN 103 may operate according to one or more of CDMA, any of these other technologies, and/or additional technologies now known or developed in the future.

The forward link channels, which carry data from BTS 106 to WCD 108 and from BTS 106 to WCD 109, may include a pilot channel, over which a phase offset pattern is repeatedly transmitted, a sync channel over which synchronization data, such as a timing reference, is transmitted, and traffic channels over which bearer traffic directed to WCD 108 and/or WCD 109 is transmitted. Additionally, one or more of the forward link channels may be designated as primary and/or secondary paging channels, and may be used for contacting WCDs.

The reverse link channels, which carry data from WCDs 108 and 109 to BTS 106, may also be formed through the use of CDMA or other technologies. These reverse link channels may include, for example, an access channel for responding to paging messages and for initiating communications, and reverse traffic channels for transmitting bearer traffic from WCD 108 to BTS 106 and from WCD 109 to BTS 106.

BSC 104 may perform a variety of tasks, including management of the wireless resources associated with BTS 106, and routing of traffic to and from BTS 106. Further, BSC 104 may be able to facilitate handoff of WCD 108 and/or WCD 109 from one wireless coverage area to another. BSC 104 may be communicatively coupled to network 102 either directly or via one or more links or other devices. For instance, BSC 104 may communicate with network 102 via MSC 105 or via an access gateway (not shown), such as a packet data serving node (PDSN) or an access serving network gateway (ASN-GW).

MSC 105 may perform many of the functions of a Class 5 telephony switch, but with additional functionality to manage the mobility of subscriber devices, such as WCD 108 and 109. For example, MSC 105 may comprise or be communicatively coupled with a visitor location register (VLR) and a home location register (HLR). MSC 105 may be responsible for switching functions, media transport functions, transcoding functions, short message service (SMS) functions, and managing the communications between WCDs and any the circuit switched functions of network 102 or other networks.

Furthermore, MSC 105 may track subscriber usage to facilitate billing and performance monitoring. To do so, for each call that the MSC 105 handles, MSC 105 may generate a Call Detail Record (CDR). The CDR may take various forms but often includes certain information about the call, such as the originating number, terminating number, the sector or sectors in which the call occurred, start time, stop time, and/or call type (e.g., local or long-distance, voice or data, and so on). MSC 105 may transmit these CDRs to a central entity that maintains a database in which the CDRs are compiled. It should be understood that RAN components other than MSCs may generate CDRs in addition to or instead of MSC 105 generating CDRs.

WCD 108 and WCD 109 may be two of potentially many WCDs being provided service in wireless coverage area 110. Such WCDs could be a wireless telephone, a wireless personal digital assistant, a wirelessly equipped laptop computer, a wireless router, or another type of mobile or fixed wireless device. Preferably, a WCD is a subscriber device that is manipulated by a human in order to establish and engage in circuit-switched or packet-switched voice and/or data calls. However, a WCD could also be an automated device without a human interface.

A WCD may be associated with zero or more RANs at a time and may use the wireless coverage areas of these RANs to communicate, via network 102, with correspondent nodes, such as web servers, gaming servers, short message service (SMS) servers, signaling and media nodes, other WCDs, and other communication devices (e.g., wireline phones).

It should be understood that FIG. 1 is presented merely for purposes of example, and that communication network 100 may comprise more or fewer components in different arrangements than shown. Further, each of these devices, such as BSC 104, MSC 105, and BTS 106, may include multiple physical or logical components arranged to operate in conjunction with one another. Alternatively or additionally, these devices may be able to be combined with one another into a smaller number of logical or physical devices. In sum, changes may be made to the arrangement illustrated by FIG. 1 without departing from the scope of the invention.

II. Paging Functionality

When a RAN seeks to communicate with a WCD (e.g., to establish an incoming voice call or transmit incoming packet data), the RAN may first page the WCD on a paging channel. The purpose of paging the WCD may be to determine whether the WCD is still within range of a wireless coverage area, and if so, to notify the WCD of the incoming communication. If the WCD is successfully paged, the RAN may assign one or more traffic channels to WCD.

Preferably, a paging channel comprises one or more of the forward links supported by the wireless coverage area. The paging channel may operate in a slotted manner, according to time-division multiplexing (TDM), and multiple WCDs may be grouped together and assigned to the same paging channel slot. Each paging channel slot is typically divided into four frames, each of which comprises two half-frames, resulting in a total of eight half-frames per paging channel slot. In a given paging channel slot, the RAN preferably transmits one or more general paging messages (GPMs), each containing information sufficient to identify which WCD or WCDs of the group (if any) are being paged. Thus, a WCD served by the wireless coverage area may periodically listen to its assigned paging channel slot to determine whether the RAN is seeking to page the WCD.

Paging is typically initiated when an MSC receives an indication that a WCD should be paged (e.g., an incoming call), or when the MSC itself determines that a WCD should be paged. The indication normally includes a WCD identifier, such as a Network Access Identifier (NAI), a Mobile Directory Number (MDN), a Mobile Identification Number (MIN), an International Mobile Subscriber Identifier (IMSI), an electronic serial number (ESN), and/or a mobile equipment identifier (MEID). The MSC may then transmit some representation of the indication to the appropriate BTS or BTSs. In turn, the BTS may use the WCD identifier to generate a page record, which the BTS may then place in a GPM for transmission to the WCD. (A GPM may also be referred to as a "page-request message" or just a "page.") The WCD may then reply with to the BTS with a page-response message (PRM) sent via a reverse-link access channel. After receiving the PRM and verifying the page was successfully received, the RAN may then assign one or more traffic channels to the WCD.

A. Resending Pages and Zone-Based Paging

In a further aspect of paging, a RAN will typically resend a page (and possibly do so a number of times) when a page fails to reach (or seemingly fails to reach) a WCD. More specifically, when a RAN does not receive a PRM from a WCD, the switch in the serving system (e.g., MSC 105) preferably attempts to re-page the WCD. In particular, an MSC 105 may wait a predetermined period of time (ten seconds, for instance) to receive an indication from a base station, which indicates a page response message has been received. If the MSC 105 does not receive such an indication, the MSC will resend the page to the base station to again be transmitted to the WCD. The MSC typically repeats this process until a page response message indicates that the page was successfully received, or until a maximum number of attempts has been made without receiving a PRM, and the page is deemed to have failed.

In an exemplary embodiment, a switch may have various paging-scheme settings that affect the manner in which the switch resends a page. In particular, the switch may define a "maximum-attempt" parameter, the value of which indicates the maximum number of attempts that can be made to send a given page. Further, the switch may track the "paging-attempt status" of a given page; which may also be referred to as the switch's "attempt count" for the page (i.e., how many attempts have been made by the switch to send the page). For example, an MSC may include, maintain, or have access to a database that tracks the paging-attempt status of pages initiated by the MSC. As such, when a page is successfully received at the intended WCD, and a PRM is received at the base station from which the page was sent, this may be relayed to the switch. The switch then knows not to initiate additional attempts to send the page and refrains from sending pages out to the base station from making additional attempts to send out the page. On the other hand, if the switch does not receive an indication that the page was successful from any base station, the switch will check the paging-attempt status, and if appropriate, send the page to one or more base stations for transmission in their respective coverage areas.

In addition, the switch may implement a "page-attempt timer," which the switch uses to determine when to make a subsequent paging attempt. Accordingly, if additional attempts to send the page are possible after the switch makes an attempt to send the page (i.e., if the attempt count for the page is less than the maximum-attempt value after the switch sends an indication to one or more base stations to page the WCD), the switch starts the page-attempt timer. Then, if no acknowledgement has been received from the WCD when the page-attempt timer expires, the switch initiates the next attempt to send the page.

In a further aspect, given the scarcity of paging channel resources in most modern cellular networks, paging across multiple sectors is typically implemented with a more-targeted paging process that is commonly referred to as "zone-based paging." With zone-based paging, a cellular network is divided into paging zones, each with a respective zone ID, and paging is performed on a zone-basis. To facilitate this, each base station (e.g., BTS 106) in the system may broadcast as one of its overhead parameters the zone ID for the zone in which the base station is located. A WCD 108 operating in the network may then programmatically monitor the zone IDs indicated in the overhead messages and may automatically register with the network when they detect that they have moved into a new zone, or for other reasons. With this process, the registration records thereby maintained by switches and/or home location registers will indicate the paging zone in which each WCD last registered.

When a switch (e.g., MSC 105) seeks to page a WCD, the switch may then efficiently send the page message to just those base stations that are within the zone of the WCD's last registration, as it is likely that the WCD is in that zone. Further, the switch may send the page message to the base stations in zones adjacent to the WCD's zone of last registration, to cover the possibility that the WCD has moved to a new zone but has not yet registered its presence in the new zone.

Figure 2:
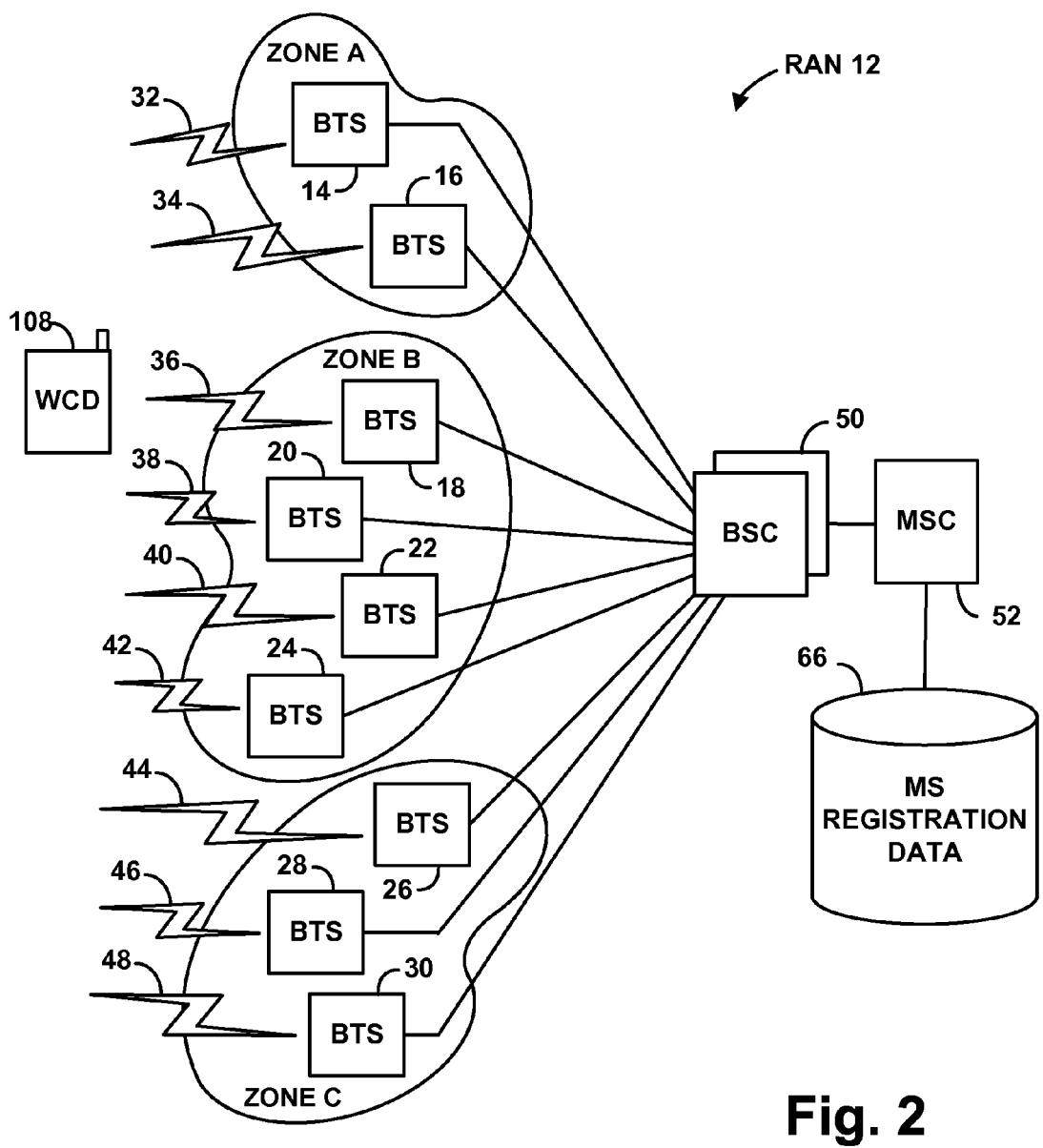
FIG. 2 is a block diagram illustrating a portion of a coverage area of radio access network that is divided into paging zones according to a zone-based paging scheme, according to an exemplary embodiment.

FIG. 2 is a block diagram illustrating a portion of a coverage area of radio access network 12, which is divided into paging zones according to a zone-based paging scheme. As shown, the base stations 14-30 are grouped into zones A, B, and C to facilitate zone-based paging as described above. In particular, each base station may broadcast a zone ID indicating its zone, and a WCD such as WCD 108 may monitor the zone IDs broadcast in the coverage areas where the WCD is operating. When the WCD detects a change in zone ID, the WCD may then responsively register its presence in the new zone, so that the RAN would then know to page the WCD in that new zone.

In an exemplary embodiment, zones are defined by MSCs (i.e., zone IDs are created, base stations are assigned to a particular zone ID, etc.). For instance, MSC 52 may create zone IDs corresponding to each zone A-C, and assign base stations 14-16 to zone A, base stations 18-24 to zone B, and base stations 26-30 to zone C. It should be understood, however, that other network entities may define paging zones, in combination with or instead of MSC 52, without departing from the scope of the invention.

As shown, MSC 52 also includes or has access to WCD registration data 66. The WCD registration data 66 preferably comprises data that specifies per WCD where the WCD is currently registered, such as the zone in which the WCD is currently registered, among possibly other information. In an exemplary embodiment, the WCD registration data may take the form of a visitor location register (VLR) database, which holds a record per WCD in the MSC's service area. The WCD's current zone of registration can thus be indicated in the WCD's VLR record. Alternatively or additionally, the WCD registration data can take the form of a home location register (HLR) database that is accessible via the MSC 52. Still alternatively, the data may be stored internally at the MSC and/or base stations, or elsewhere in some other form.

Using the general paging strategy that is implemented in many RANs providing IS-2000 and/or EVDO service, a RAN makes up to three attempts to page a WCD. In particular, the MSC 52 may initiate a first attempt by sending a page to one or more base stations for transmission in the paging zone B in which the WCD is registered (i.e., the base stations in the paging zone in which the WCD is registered transmit the page record). Then, if the first attempt is unsuccessful (e.g., the WCD does not acknowledge the page), the MSC initiates a second attempt by again sending the page record to the one or more base stations for transmission in the paging zone B in which the WCD is registered, and typically to one or more additional base stations for transmission in one or more adjacent zones (e.g., zones A and C) as well. If the second attempt also fails, then the MSC initiates a third attempt to page the WCD, which typically involves sending the page record to multiple base stations for a system-wide transmission of the page record (i.e., in all paging zones within the coverage area of the switch), although it is possible that a third attempt may be of a different scope as well. Furthermore, it should be understood that an exemplary embodiment may also be implemented in a RAN that does not implement zone-based paging, without departing from the scope of the invention.

B. Intersystem Paging

Figure 3:
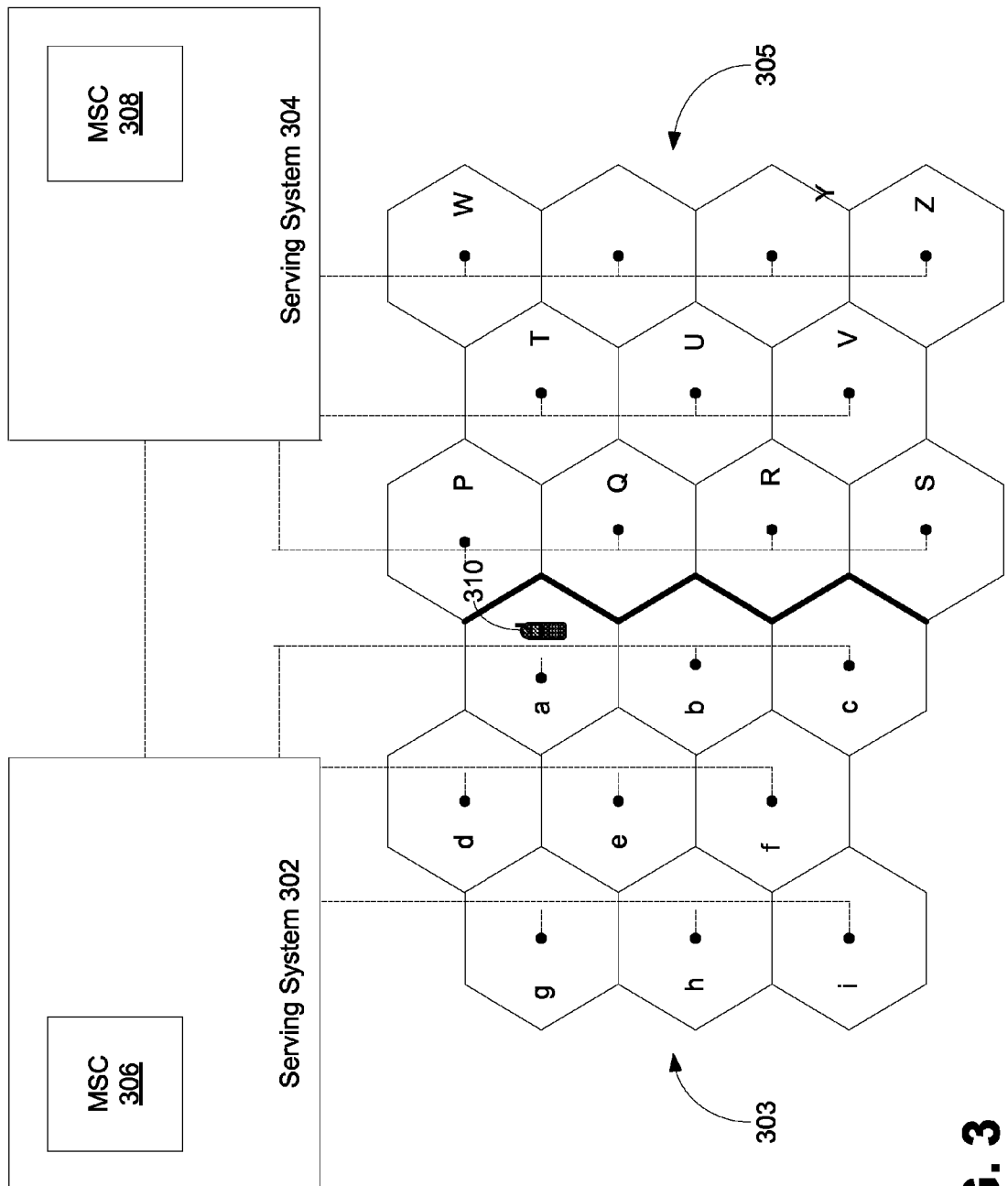
FIG. 3 is a block diagram illustrating a portion of the coverage area in an exemplary radio access network, according to an exemplary embodiment.

In a further aspect, a RAN may also be configured for "intersystem paging" (which may also be referred to as "border cell paging" or "BCP"). Intersystem paging settings specify how a WCD should be paged when the WCD is located at or near a border between serving systems (each serving system including a switch and its corresponding base stations) in a RAN's coverage. FIG. 3 is a block diagram illustrating a portion of the coverage area in an exemplary RAN, which includes two systems 302 and 304 serving coverage areas 303 and 305, respectively. In an exemplary embodiment, each system 302 and 304 is controlled by a respective MSC 306 and 308. Each system 302 and 304 provides service in a number of sectors that are served by the respective MSC (via one or more base stations (not shown)). In particular, MSC 306 serves sectors a-i, which collectively may be referred to as coverage area 303, and MSC 308 serves sectors P-Z, which collectively may be referred to as coverage area 305. In coverage area 303, sectors a-c, which are located at the border of the paging zones, are considered to be border sectors, and collectively are considered a border zone within system 302. Similarly, in coverage area 305, sectors P-S are considered to be border sectors, and collectively are considered a border zone within system 304.

When a WCD is located in a border zone, the serving MSC may be configured to send a page locally (i.e., in the sector or zone in which a mobile is registered), and to additionally send the page to the MSC serving the bordering system. Therefore, the WCD can also be paged in the bordering system, which may improve service in the event that the WCD has traveled into the coverage area of the bordering system since it last registered. Accordingly, if the WCD responds to a page from the serving system, then call setup proceeds normally. If, on the other hand, the WCD responds to a page from the bordering system, the call may be transferred to the bordering system.

For example, when a call arrives for a WCD 310 registered in system 302, the serving MSC 306 may determine if the WCD was last registered in a border zone (i.e., if the sector in which the WCD last registered is a border sector). If the WCD 310 is not registered in a border zone, then the MSC 306 proceeds to page the WCD as it otherwise would (i.e., sends a page in the sector in which the WCD is registered, and possibly neighboring sectors as well). In the illustrated scenario, however, the WCD 310 is registered in sector a, which is in the border zone of system 302. Therefore, in addition to sending the page in sector a (and possibly nearby sectors as well), the MSC 306 sends an "intersystem" page to the MSC 308 serving the bordering system 304. MSC 308 may then send the intersystem page to WCD 310 in its border zone, which includes sectors P-S (via the base station or base stations serving these sectors). If the WCD 310 responds to a page from system 302, then the call proceeds normally. If, on the other hand, the WCD 310 responds to a page from system 304, the call may be transferred to system 304.

In an exemplary embodiment, intersystem paging may be implemented using ISPAGE2 functionality, as defined by the ANSI-41 protocol (which is also referred to as IS-41). As such, intersystem pages may be relayed between systems (i.e., between MSCs) using ISPAGE2 messaging, as specified in ANSI-41. ISPAGE2 and ANSI-41 are well known in the art, and thus not described in detail herein. Further, it should be understood that the term "intersystem page", as used herein, may include any page that sent by an MSC other than the MSC serving the zone in which a given WCD is registered. As such, an MSC may identify any page it receives from another MSC, or any page it sends to another MSC, as an intersystem page.

In an exemplary embodiment, a switch may have various paging-scheme settings that affect the manner in which the intersystem paging is implemented. For example, an exemplary MSC 306 may be configured to adjust the attempt count at which intersystem paging is enabled. For example, an MSC 306 may adjust settings for intersystem paging such that intersystem paging is not enabled until the second or third attempt to send a given page, or may adjust the settings such that intersystem paging is enabled for all attempts to send the page. An exemplary MSC 306 may define other settings for intersystem paging, which may also affect the manner in which intersystem paging is implemented.

III. RAN Component Embodiment

Figure 4:
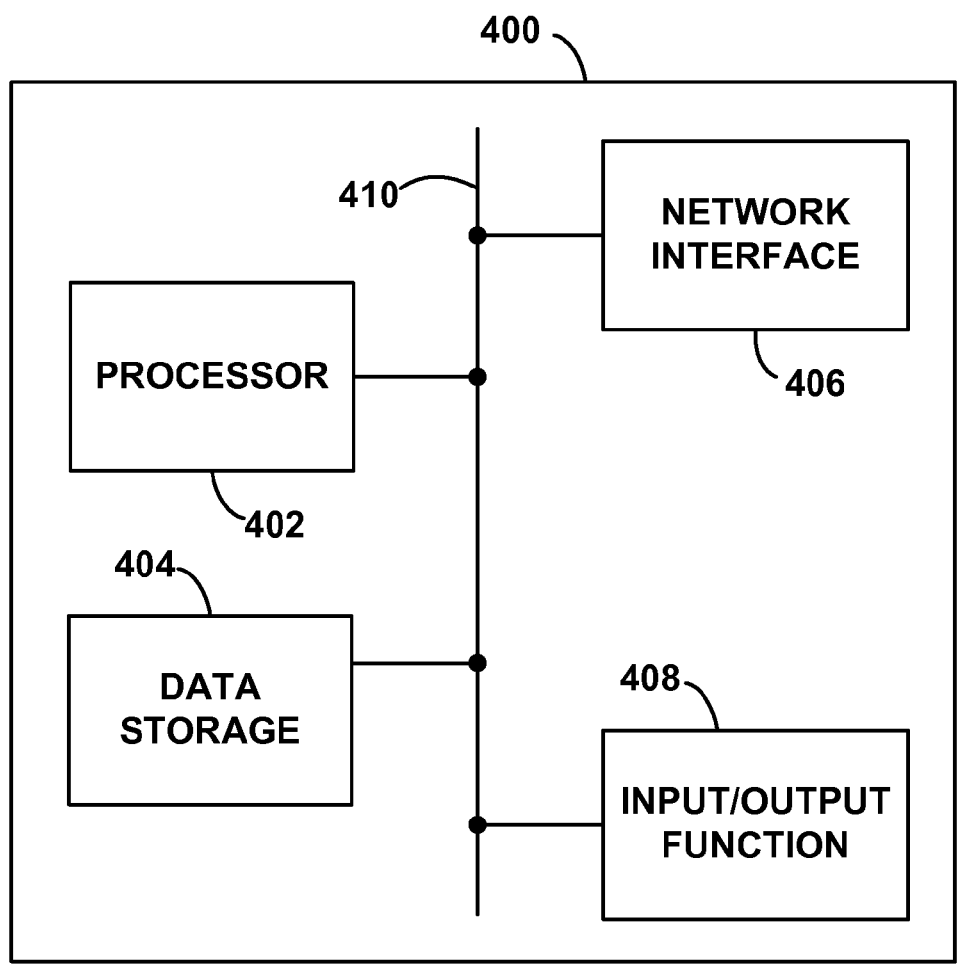
FIG. 4 is a simplified block diagram exemplifying a radio-access-network component, according to an exemplary embodiment.

FIG. 4 is a simplified block diagram exemplifying a RAN component 400, and illustrating some of the functional components that would likely be found in a RAN component arranged to operate in accordance with the embodiments herein. Preferably, in an exemplary embodiment, RAN component 400 is a switch, such as an MSC. However, an exemplary RAN component 400 may also be another type of RAN component, or another type of device or system found in or associated with a RAN, such as a BTS, a BSC, and/or an MSC.

Example RAN component 400 preferably includes a processor 402, a data storage 404, a network interface 406, and an input/output function 408, all of which may be coupled together by a system bus 410 or a similar mechanism. Processor 402 preferably includes one or more CPUs, such as one or more general purpose processors and/or one or more dedicated processors (e.g., application specific integrated circuits (ASICs) or digital signal processors (DSPs), etc.)

Data storage 404, in turn, may comprise volatile and/or non-volatile memory and can be integrated in whole or in part with processor 402. Data storage 404 preferably holds program instructions, executable by processor 402, and data that is manipulated by these instructions to carry out the various methods, processes, or functions described herein. Alternatively, these methods, processes, or functions can be defined by hardware, firmware, and/or any combination of hardware, firmware and software. By way of example, the data in data storage 404 may contain program instructions executable by processor 402 to carry out any of the methods, processes, or functions disclosed in this specification or the accompanying drawings.

Network interface 406 may take the form of a wireline connection, such as an Ethernet, Token Ring, or T-carrier connection. Network interface 406 may also take the form of a wireless connection, such as IEEE 802.11 (WiFi), BLUETOOTH®, or a wide-area wireless connection. However, other forms of physical layer connections and other types of standard or proprietary communication protocols may be used over network interface 406. Furthermore, network interface 406 may comprise multiple physical interfaces.

Input/output function 408 may facilitate user interaction with example RAN component 400. Input/output function 408 may comprise multiple types of input devices, such as a keyboard, a mouse, a touch screen, and so on. Similarly, input/output function 408 may comprise multiple types of output devices, such as a monitor, printer, or one or more light emitting diodes (LEDs). Additionally or alternatively, example RAN component 400 may support remote access from another device, via network interface 406 or via another interface (not shown), such an RS-232 or USB port.

Further, an exemplary system, such as RAN component 400 of FIG. 4, preferably takes the form of a switch in an access network, such as an MSC, although an exemplary system may also take the form of and/or include other RAN components. According to an exemplary embodiment, a switch may include data storage having program instructions stored thereon that are executable to initiate the switch functionality described herein.

For example, an exemplary system may include program instructions stored on a tangible computer-readable medium that are executable to determine that a wireless communication device (WCD) should be paged. Further, the program instructions may be executable to respond to a determination that the WCD should be paged by carrying out processes to: (a) determine that a WCD should be paged, (b) determine a WCD performance indicator for the WCD, (c) determine a coverage-area performance indicator for a last-known coverage area of the WCD, (d) use both (i) the WCD performance indicator and (ii) the coverage-area performance indicator as a basis to adjust at least one paging-scheme setting affecting attempts to page the WCD, and (e) page the WCD according to the at least one adjusted paging-scheme setting.

According to an exemplary embodiment, the paging-scheme setting or settings that are adjusted by the switch may include settings for zone-based paging, such as the maximum-attempt parameter for zone-based paging, the page-attempt timer, and/or which sectors are included on which page-attempt number, among others. Additionally or alternatively, the paging-scheme setting or settings that are adjusted by the switch may include settings for intersystem paging such as the page-attempt number at which intersystem paging is initiated, the number of intersystem pages that can be attempted (e.g., maximum-attempt parameter for intersystem paging), and/or the time between intersystem pages (e.g., a page-attempt timer for intersystem paging).

Further, the paging-scheme setting or settings that are adjusted by the switch may include the intersystem paging area. In particular, RAN component 400 may adjust the area of an adjacent system is included in an intersystem. For example, RAN component 400 may adjust which zones of an adjacent system or systems are included. As specific examples, a given intersystem page may include only border cells or border zones or may be system wide. Other examples are also possible.

III. Exemplary Methods

Exemplary methods may be implemented by a switch to adjust paging-scheme settings based upon both the combination of performance indicators for a given WCD and the sector in which the WCD is located.

Figure 5A:
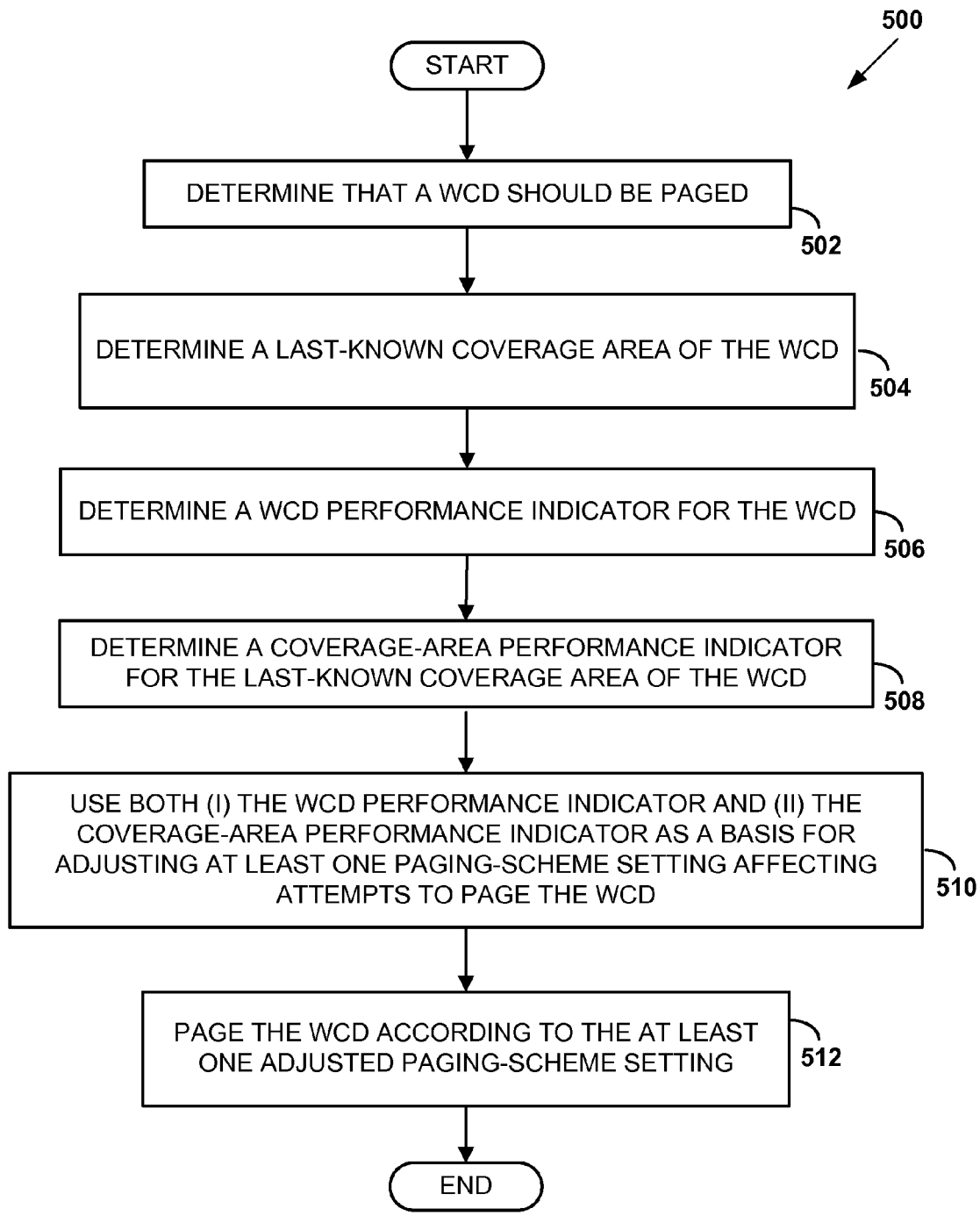
FIG. 5A is a flow chart illustrating a method according to an exemplary embodiment.

FIG. 5A is a flow chart illustrating a method according to an exemplary embodiment. Method 500 and other exemplary methods may be described by way of example herein as generally being carried out by a switch in a RAN. However, it should be understood that an exemplary method or portions thereof may be carried out by other RAN components and/or a combination of RAN components, without departing from the scope of the invention.

As shown in FIG. 5A, method 500 involves a switch determining that a WCD should be paged, as shown by block 502. In response to determining that the WCD should be paged, the switch determines a last-known coverage area of the WCD, as shown by block 504. The switch may then determine a WCD performance indicator for the WCD, as shown by block 506. Further, the switch may determine a coverage-area performance indicator for the last-known coverage area of the WCD, as shown by block 508. The switch may then use both (i) the WCD performance indicator and (ii) the coverage-area performance indicator as a basis for adjusting at least one paging-scheme setting affecting attempts to page the WCD, as shown by block 510. The switch may then proceed to page the WCD according to the at least one adjusted paging-scheme setting, as shown by block 512.

In a further aspect, the function of using both (i) the WCD performance indicator and (ii) the coverage-area performance indicator to adjust at least one paging-scheme setting, as shown by block 510, may involve using an overall performance indicator to adjust at least one paging-scheme setting. As such, an exemplary method may further involve determining the overall performance indicator based at least in part on (i) the WCD performance indicator and (ii) the coverage-area performance indicator. This determination may be accomplished in various ways, as is discussed in greater detail later in this description.

Figure 5B:
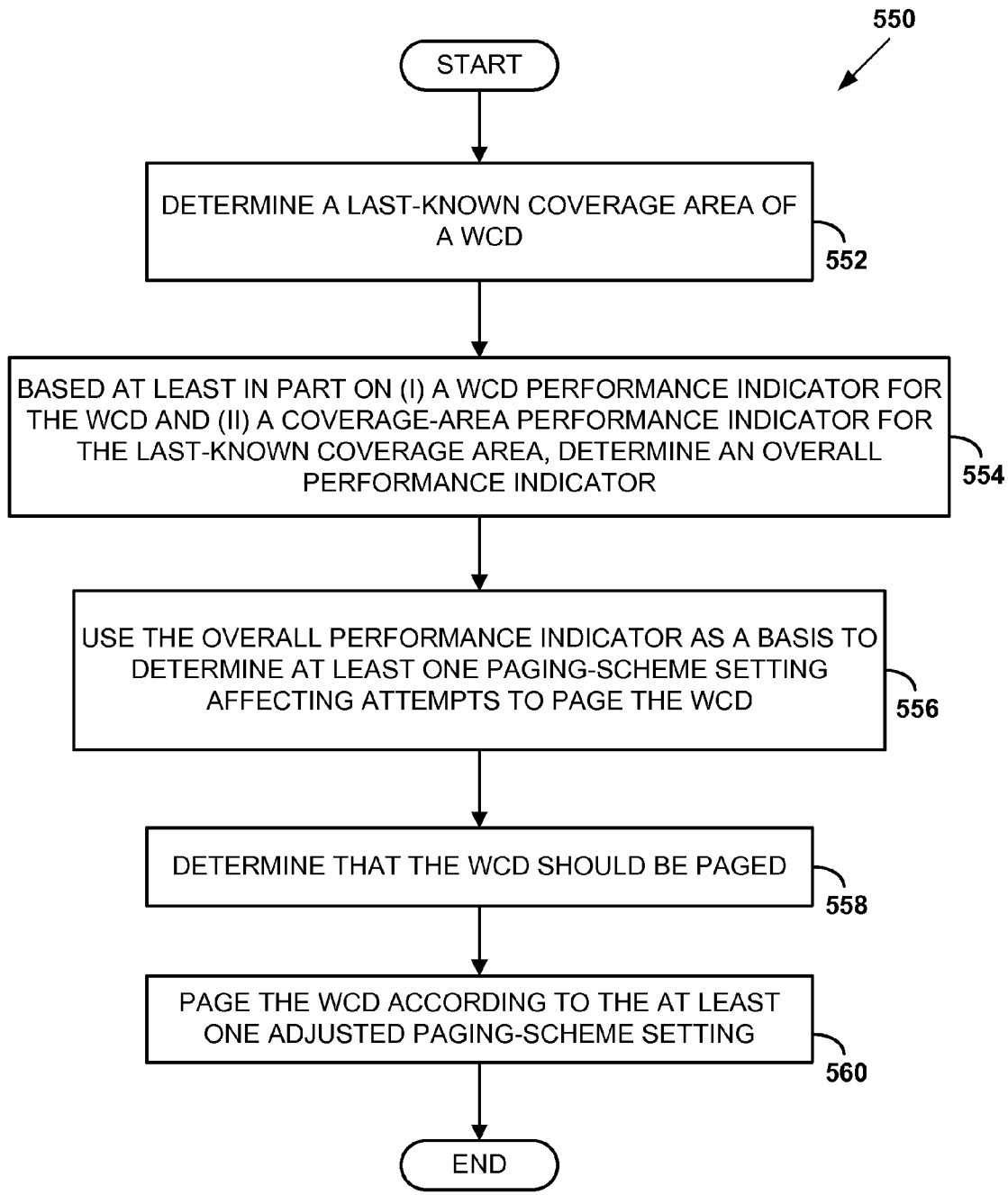
FIG. 5B is another flow chart illustrating a method according to an exemplary embodiment.

FIG. 5B is another flow chart illustrating a method according to an exemplary embodiment. In particular, method 550 involves a switch determining a last-known coverage area of a WCD, as shown by block 552. Then, based at least in part on (i) a WCD performance indicator for the WCD and (ii) a coverage-area performance indicator for the last-known coverage area, the switch determines an overall performance indicator, as shown by block 554. The switch then uses the overall performance indicator as a basis for determining at least one paging-scheme setting affecting attempts to page the WCD, as shown by block 556. The switch then determines that the WCD should be paged, as shown by block 558. In response to determining that the WCD should be paged, the switch pages the WCD according to the at least one adjusted paging-scheme setting, as shown by block 560.

Note that in method 500, the switch performs the functions of blocks 504 through 510 when it determines that the WCD needs to be paged. In method 550, however, this is not necessarily the case. Rather, in method 550, the switch may perform the functions of some or all of blocks 554 through 558 before determining that the WCD should be paged. For instance, in some embodiments of method 550, the switch may periodically update coverage-area performance indicators for coverage areas served by the switch, and might further update WCD performance indicators for WCDs that are registered in coverage areas served by the switch, so that this data is available when a given WCD needs to be paged. Accordingly, when a switch implementing method 550 determines that a given WCD should be paged in a given coverage area, it may be retrieve the most-recently determined coverage-area performance indicator for this coverage area, as well as the most-recently determined WCD performance indicator for this WCD, use these indicators to determine an overall performance indicator, and adjust the paging-scheme settings accordingly.

In both exemplary methods 500 and 550, the WCD performance indicator and the coverage-area performance indicator are both evaluated so that paging-scheme settings can be set accordingly by the switch. In particular, the paging-scheme settings may be adjusted so as to increase the likelihood of success for a page to a WCD in a low-performance area and/or to a WCD that is determined to perform poorly itself. For example, in such a scenario, an MSC may adjust paging-scheme settings to, for example, initially send a system-wide page, allow for additional page attempts, and/or increase paging power. Other examples are also possible.

A. Last-Known Coverage Area

In some embodiments, the last-known coverage area may be the sector of the RAN in which a last call of the WCD ended. In such an embodiment, the BSC, MSC, and/or another RAN component or components may first retrieve, look up, and/or use CDRs for the WCD in order to determine the sector in which the WCD's last call ended. This data may be maintained in MSCs or elsewhere.

In other embodiments, the last-known coverage area may be a coverage area of the radio access network in which the WCD last registered. For instance, this coverage area may be the zone in which the WCD last registered, or the sector in which the WCD last registered. In an embodiment where the RAN determines the sector in which the WCD last registered, the MSC and/or the BSC may do so by querying an HLR for the zone in which the WCD is currently registered.

Further, it should be understood that the last-known coverage area may take other forms, without departing from the scope of the invention.

B. WCD Performance Indicator

In an exemplary embodiment, the WCD performance indicator may take various forms. In some embodiments, the WCD performance indicator may be based on a measure of dropped calls by the WCD (e.g., a dropped-call rate for the WCD). That is, the WCD performance indicator may be a dropped-call rate that is calculated for the WCD, or may be a function of such a dropped-call rate.

For example, the MSC may determine a dropped-call rate by determining the percentage of a particular WCD's calls that have been dropped. This percentage may then be used as the WCD performance indicator, or as input to a function for determining the WCD performance indicator. Generally, the way in which a WCD's dropped-call percentage is used to determine the WCD performance indicator may vary depending upon the implementation and/or design goals.

In some embodiments, the dropped-call rate may be cumulative, and thus determined by calculating the percentage of calls dropped over all time by a given WCD (e.g., the total number of calls that have been dropped by the WCD divided by the total number of calls in which the WCD has been involved). Alternatively, the dropped-call rate may be cumulative over time but periodically reset. As another alternative, the dropped-call rate may be periodically recalculated based on a WCD's calls over a predetermined period of time (e.g., calculated over a moving window of time). For example, on a given day, the WCD may determine a percentage by dividing the total number of calls that have been dropped by the WCD in the last seven days by the total number of calls in which the WCD has been involved in the last seven days. Other examples are also possible.

In an alternative implementation, the measure of dropped calls may be based on the average number of dropped calls by the WCD per unit of time. For example, an MSC may determine a WCD performance indicator by calculating the average number of dropped calls per minute of usage. Other measures of a WCD's dropped calls are also possible.

Further, in some embodiments, the WCD performance indicator may indicate the WCD's performance in a particular coverage area (e.g., the last-known coverage area). For instance, the dropped-call rate (e.g., the percentage of dropped calls) for a WCD may be determined for the WCD's last-known coverage area (e.g., the coverage area in which the WCD last registered or in which the WCD's last call ended). Alternatively, the WCD performance indicator may be determined over any and all coverage areas. And as yet another alternative, the WCD performance indicator may be determined over a representative subset of the coverage areas in which the WCD has operated.

Drop-call statistics and other usage records, which may be used to determine the WCD performance indicator, are routinely maintained by service providers. For instance, this data may be provided by or derived from CDRs and/or other data that service providers typically aggregate and store.

In some embodiments, the WCD performance indicator may be based on a measure of connection success rate for data connections. For instance, the connection success rate for a particular WCD may be calculated by determining a percentage of a particular WCD's attempts to connect for purposes of transmitting and/or receiving data, which have been successful. In a similar manner as other WCD performance indicators (e.g., a dropped-call rate), the connection success rate may be cumulative, and thus determined by calculating the percentage of a given WCD's connection attempts that are successful, or may be periodically recalculated based on a WCD's connection attempts during a predetermined period of time. Alternatively, the connection success rate for a WCD may be calculated as an average rate, which is based on the average number or average percentage of a WCD's attempts to connect that are successful over a predetermined period of time.

Additionally or alternatively, a WCD performance indicator for data performance may take the form of the average forward-link throughput for the WCD and/or the average reverse-link throughput for the WCD. Other WCD performance indicators that are based on data communications are also possible.

C. Performance Indicator for a Coverage Area

In an exemplary embodiment, the coverage-area performance indicator may take various forms. For example, the coverage-area performance indicator may be based on a measure of dropped calls for the last-known coverage area of the WCD. The measure of dropped calls may be, for instance, a percentage of calls that have been dropped in the last-known coverage area. Alternatively, the measure of dropped calls may be the average number of dropped calls in the last-known coverage area per unit of time. For example, a switch may determine the coverage-area performance indicator by calculating the average number of dropped calls per minute of usage for all WCDs (e.g., the total number of dropped calls divided by that the total talk time for all WCDs), or possibly a representative subset of WCDs, which have operated in the coverage area. Other examples are possible.

In a further aspect, the coverage-area performance indicator for a given coverage area may be cumulative over all time, may be periodically reset or continuously updated, and/or may be periodically re-determined over a predetermined period of time.

In some embodiments, the coverage-area performance indicator may be indicative of performance in a particular sector. For example, the coverage-area performance indicator may be the dropped-call rate for all WCDs, or possibly a representative subset of WCDs, which have operated in a given sector. Other examples are also possible.

In another aspect, the MSC may also determine a coverage-area performance indicator for a zone, and in particular, for the last-known zone of a WCD. For example, the MSC may look up the zone in which the WCD last registered. The MSC may then determine a performance indicator for each sector in this zone, and use all of these individual performance indicators to determine the performance indicator for the zone. For instance, the MSC may determine the coverage-area performance indicator by averaging the individual performance indicators of the sectors in the zone. Other techniques may also be used to determine the coverage-area performance indicator for a given zone.

Drop-call statistics and other usage records, which may be used to determine the coverage-area performance indicator, are routinely maintained by service providers. For instance, this data may be provided by or derived from CDRs and/or other data that service providers typically aggregate and store.

In some embodiments, a coverage-area performance indicator may take the form of a usage indicator for a coverage area, such as an indicator of traffic in the coverage area measured in Erlangs. Such a usage indicator may also be determined based on the average minutes of use (MOU) in the given coverage area. Further, such usage indicators may be determined for the particular type of communication for which the MS is being paged (e.g., voice call, SMS, or data).

In some embodiments, a coverage-area performance indicator may be based on a measure of connection success rate for data connections in a coverage area. For instance, the connection success rate for WCDs in a given coverage area may be calculated by determining a percentage of attempts to connect for purposes of transmitting and/or receiving data that are successful in the coverage area. In a similar manner as other coverage-area performance indicators (e.g., a dropped-call rate), the connection success rate for a coverage area may be cumulative, and thus determined by calculating, over all time, the percentage of connection attempts that are successful in the coverage area, or may be periodically recalculated based on connection attempts in the coverage area during a predetermined period of time. Alternatively, the connection success rate for a coverage area may be calculated as an average rate, which is based on the average number or the average percentage of attempts to connect that are successful during a predetermined period of time.

Additionally or alternatively, a coverage-area performance indicator for data performance may take the form of the average forward-link throughput in the coverage area and/or the average reverse-link throughput in the coverage area. Other WCD performance indicators that are based on data communications are also possible.

D. Overall Performance Level Indicator

As noted, an exemplary method may involve determining an overall performance indicator, which is based on the WCD performance indicator and the coverage-area performance indicator, and then adjusting at least one paging-scheme setting according to the overall performance indicator. Various techniques may be used to determine the overall performance indicator.

For example, in some embodiments, the switch may average the WCD performance indicator and the coverage-area performance indicator. To do so, the RAN may determine a dropped-call rate for the WCD and a dropped-call rate for the last-known coverage-area of the WCD. As a specific example, if a WCD has dropped seven calls out of 1000 calls in which the WCD has been involved, WCD performance indicator for the WCD may be determined to be 0.07%. Further, if 900 out of 100,000 calls have been dropped in the WCD's last-known coverage area, the coverage-area performance indicator may be determined to be 0.09%, then the overall performance indicator may be determined to be 0.08%. Variations on this example and other examples are also possible.

The overall performance indicator may be based upon a WCD performance indicator that is determined from the WCD's behavior in all sectors or a subset of sectors that a WCD operates in. However, the overall performance indicator may also be based upon a WCD performance indicator that is specific to the WCD's behavior in the last-known coverage area. For instance, while the WCD in the above example has dropped seven out of 1000 calls, it may have made 500 of these calls, and dropped only one of these calls, in its last-known coverage area. Accordingly, if the WCD performance indicator is determined for the last-known coverage area, then the WCD performance indicator may be determined to be 0.02%, and thus the overall performance indicator may be determined to be 0.055%. Variations on this example and other examples are also possible.

In some embodiments, the overall performance indicator may be a measure of dropped calls per minute of talk time. For instance, a WCD may have dropped twelve calls during two thousand minutes of talk time (e.g., two thousand minutes in which the mobile station is engaged in a call). As such, the WCD performance indicator may be determined to be 0.006 dropped calls per minute of talk time (dropped/min). Further, the coverage-area performance indicator for the last-known coverage area of the WCD may be determined to be 0.002 dropped/min. As such, the overall performance indicator may be determined to be 0.004 dropped/min. Variations on this example and other examples are also possible.

In some embodiments, the overall performance indicator may alternatively be determined by totaling the WCD performance indicator and the coverage-area performance indicator. For instance, a WCD may have dropped twenty calls during two thousand minutes of talk time (e.g., two thousand minutes in which the mobile station is engaged in a call). As such, the WCD performance indicator may be determined to be 0.010 dropped/min. Further, the coverage-area performance indicator for the last-known coverage area of the WCD may be determined to be 0.026 dropped/min. Therefore, by summing the WCD performance indicator and the coverage-area performance indicator, the overall performance indicator may be determined to be 0.036 dropped/min.

The above-described techniques for using the WCD performance indicator and the coverage-area performance indicator to determine the overall performance indicator should not be construed as limiting, as it possible that variations and alternative techniques to the above may be employed, without departing from the scope of the invention.

In some embodiments, the overall performance indicator may simply be a combination of the WCD performance indicator and the coverage-area performance indicator. For example, consider a system where a WCD performance indicator and the coverage-area performance indicator are both binary indicators. In particular, the WCD performance indicator may be determined by calculating a dropped-call rate as a percentage of dropped calls, and then comparing the dropped-call rate to a threshold rate. If the dropped-call rate is less than a threshold rate, then the WCD performance indicator is set to "1", and if the dropped-call rate is greater than the threshold rate, then the WCD performance indicator is set to "0". Further, the coverage-area performance indicator may be determined by calculating a dropped-call rate as a percentage of dropped calls, and then comparing the dropped-call rate to a threshold rate. If the dropped-call rate is less than a threshold rate, then the coverage-area performance indicator is set to "1", and if the dropped-call rate is greater than the threshold rate, then the coverage-area performance indicator is set to "0". In such a system, the overall performance may simply be a two digit combination of the WCD performance indicator and the coverage-area performance indicator (e.g., "00", "01", "10", or "11"). Other examples are also possible.

E. Adjustment of Paging-Scheme Settings at a Switch

According to an exemplary method, a switch, such as an MSC, may adjust various paging-scheme settings, either alone or in combination, based upon (i) a WCD performance indicator for the WCD and (ii) a coverage-area performance indicator for the last-known coverage area. For example, the switch may adjust: (i) one or more of the settings for zone-based paging, (ii) the value of the maximum attempt parameter, (iii) one or more of the settings for intersystem paging, and/or (iv) the duration of the page-attempt timer. It is also possible that other paging-scheme settings may be adjusted in addition to, or in the alternative to, the above-listed settings. A switch may use a variety of techniques, based on the combination of the WCD performance indicator and the coverage-area performance indicator, to set one or more paging-scheme settings. Generally, the lower the performance level of the WCD and/or in the last-known coverage area, the greater the measures that will be taken to increase the likelihood that the WCD is successfully paged.

As a specific example, consider a system where a WCD performance indicator and the coverage-area performance indicator are both binary indicators. In particular, the WCD performance indicator may be determined by calculating a dropped-call rate as a percentage of dropped calls, and then comparing the dropped-call rate to a threshold rate. If the dropped-call rate is less than a threshold rate, then the WCD performance indicator is set to "1", and if the dropped-call rate is greater than the threshold rate, then the WCD performance indicator is set to "0". Further, the coverage-area performance indicator may be determined by measuring the Erlangs in the coverage, and then comparing the measured Erlangs to a threshold level. If the measured Erlang level is less than the threshold level, then the coverage-area performance indicator is set to "1", and if the measured Erlang level is greater than the threshold level, then the coverage-area performance indicator is set to "0". As such, the overall performance indicator may be determined to be "00", "01", "10", or "11", depending upon the dropped-call rate of a particular WCD and the measured Erlang level in the coverage area where the WCD is located.

If the overall performance indicator is determined to be 00, then this is an indication that the WCD is a relatively poor performer, and an indication that the coverage area has a lower capacity. The switch may adjust the paging-scheme settings for the WCD accordingly. For example, the switch may increase the number of attempts that can be made, may increase the area in which pages are sent, and/or may increase the paging power.

If the overall performance indicator is determined to be 01, then this is an indication that the WCD is a relatively poor performer, and an indication that the coverage area has a higher relative capacity. The switch may therefore adjust the paging-scheme settings for the WCD in an effort to compensate for the poorly performing WCD, albeit to a lesser extent than when the overall performance indicator is equal to 00.

Further, if the overall performance indicator is determined to be 10, then this is an indication that the WCD is a relatively strong performer, but is also an indication that the coverage area has a lower relative capacity. The switch may adjust the paging-scheme settings for the WCD in an effort to compensate for the lower relative capacity, albeit to a lesser extent than when the overall performance indicator is equal to 00. In some embodiments, the switch may adjust paging-scheme settings similarly when the overall performance indicator is determined to be 10 or 01, although it is also possible that these scenarios may be handled differently.

Yet further, if the overall performance indicator is determined to be 11, then this is an indication that the WCD is a relatively strong performer, and an indication that the coverage area has a higher relative capacity. The switch may therefore adjust the paging-scheme settings so as to conserve paging resources, as it is more likely that a page to this WCD will be successful. For example, the switch may decrease the number of attempts that can be made, may decrease the area in which pages are sent, and/or may decrease the paging power.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

I claim:

1. A method comprising:
   at a switch in a radio access network, determining that a wireless communication device (WCD) should be paged; and
   responsive to determining that the WCD should be paged, the switch:
      determining a coverage-area performance indicator for a last-known coverage area of the WCD;
      determining a WCD performance indicator for the WCD, wherein the WCD performance indicator comprises a percentage of calls involving the WCD that have been dropped by the WCD;
      using both (i) the WCD performance indicator and (ii) the coverage-area performance indicator, as a basis for adjusting at least one paging-scheme setting of the switch affecting attempts to page the WCD, wherein using both the WCD performance indicator and the coverage-area performance indicator as a basis for adjusting at least one paging-scheme setting comprises: (a) determining an overall performance indicator based at least in part on (i) the WCD performance indicator and (ii) the coverage-area performance indicator, and (b) using the overall performance indicator as a basis for adjusting at least one paging-scheme setting affecting attempts to page the WCD; and
      paging the WCD according to the at least one adjusted paging-scheme setting.

2. The method of claim 1, further comprising, determining the last-known coverage area of the WCD.

3. The method of claim 2, wherein the last-known coverage area of the WCD is a coverage area in which a last call of the WCD ended.

4. The method of claim 2, wherein the last-known coverage area of the WCD is a coverage area in which the WCD last registered with the radio access network.

5. The method of claim 1, wherein the coverage-area performance indicator comprises a measure of dropped calls for the last-known coverage area of the WCD.

6. The method of claim 5, wherein the measure of dropped calls comprises a percentage of calls in the last-known coverage area that are dropped.

7. The method of claim 5, wherein the measure of dropped calls comprises an average number of dropped calls in the last-known coverage area per unit of time.

8. The method of claim 1, wherein adjusting at least one paging-scheme setting affecting attempts to page the WCD comprises adjusting at least one setting for zone-based paging.

9. The method of claim 1, wherein adjusting at least one paging-scheme setting affecting attempts to page the WCD comprises adjusting a maximum attempt parameter.

10. The method of claim 1, wherein adjusting at least one paging-scheme setting affecting attempts to page the WCD comprises adjusting at least one setting for intersystem paging.

11. The method of claim 1, wherein adjusting at least one paging-scheme setting affecting attempts to page the WCD comprises setting a duration of a page-attempt timer.

12. The method of claim 1, wherein determining the overall performance indicator comprises:
   determining an average of the (i) the WCD performance indicator and (ii) the coverage-area performance indicator; and
   using the average as a basis for determining the overall performance indicator.

13. The method of claim 1, wherein determining the overall performance indicator comprises:
   determining a sum of the (i) the WCD performance indicator and (ii) the coverage-area performance indicator; and
   using the sum as a basis for determining the overall performance indicator.

14. A method comprising:
   at a switch in a radio access network, determining that a wireless communication device (WCD) should be paged;
   determining a WCD performance indicator for the WCD, wherein the WCD performance indicator comprises a percentage of calls involving the WCD that have been dropped by the WCD;
   determining a coverage-area performance indicator for a last-known coverage area of the WCD;
   using both (i) the WCD performance indicator and (ii) the coverage-area performance indicator as a basis for adjusting at least one paging-scheme setting of the switch affecting attempts to page the WCD, wherein using both the WCD performance indicator and the coverage-area performance indicator as a basis for adjusting at least one paging-scheme setting comprises: (a) determining an overall performance indicator based at least in part on (i) the WCD performance indicator and (ii) the coverage-area performance indicator, and (b) using the overall performance indicator as a basis for adjusting at least one paging-scheme setting affecting attempts to page the WCD; and paging the WCD according to the at least one adjusted paging-scheme setting.

15. The method of claim 14, further comprising:
determining an overall performance indicator based at least in part on (i) the WCD performance indicator and (ii) the coverage-area performance indicator;
wherein using both (i) the WCD performance indicator and (ii) the coverage-area performance indicator as bases for adjusting the at least one paging-scheme setting comprises using the overall performance indicator as a basis for adjusting at least one paging-scheme setting affecting attempts to page the WCD.

16. A system comprising:
a non-transitory computer readable medium; and
program instructions stored on the non-transitory computer readable medium and executable by at least one processor to:
   determine that a wireless communication device (WCD) should be paged;
   determine a WCD performance indicator for the WCD, wherein the WCD performance indicator comprises a percentage of calls involving the WCD that have been dropped by the WCD;
   determine a coverage-area performance indicator for a last-known coverage area of the WCD;
   use both (i) the WCD performance indicator and (ii) the coverage-area performance indicator as a basis to adjust at least one paging-scheme setting of the switch affecting attempts to page the WCD, wherein the use of both the WCD performance indicator and the coverage-area performance indicator as a basis to adjust at least one paging-scheme setting comprises: (a) a determination of an overall performance indicator based at least in part on (i) the WCD performance indicator and (ii) the coverage-area performance indicator, and (b) use of the overall performance indicator as a basis for adjusting at least one paging-scheme setting affecting attempts to page the WCD; and
   page the WCD according to the at least one adjusted paging-scheme setting.

17. A method comprising:
at a switch in a radio access network, determining that a wireless communication device (WCD) should be paged; and
responsive to determining that the WCD should be paged, the switch:
   determining a coverage-area performance indicator for a last-known coverage area of the WCD;
   determining a WCD performance indicator for the WCD, wherein the WCD performance indicator comprises an average number of dropped calls by the WCD per unit of time;
   using both (i) the WCD performance indicator and (ii) the coverage-area performance indicator, as a basis for adjusting at least one paging-scheme setting of the switch affecting attempts to page the WCD; and
   paging the WCD according to the at least one adjusted paging-scheme setting;
wherein using both the WCD performance indicator and the coverage-area performance indicator as a basis for adjusting at least one paging-scheme setting comprises: (a) determining an overall performance indicator based at least in part on (i) the WCD performance indicator and (ii) the coverage-area performance indicator, and (b) using the overall performance indicator as a basis for adjusting at least one paging-scheme setting affecting attempts to page the WCD.

* * * * *